(No Model.)
C. B. BOSWORTH.
AUTOMATIC PRESSURE REGULATOR.
No. 333,818. Patented Jan. 5, 1886.
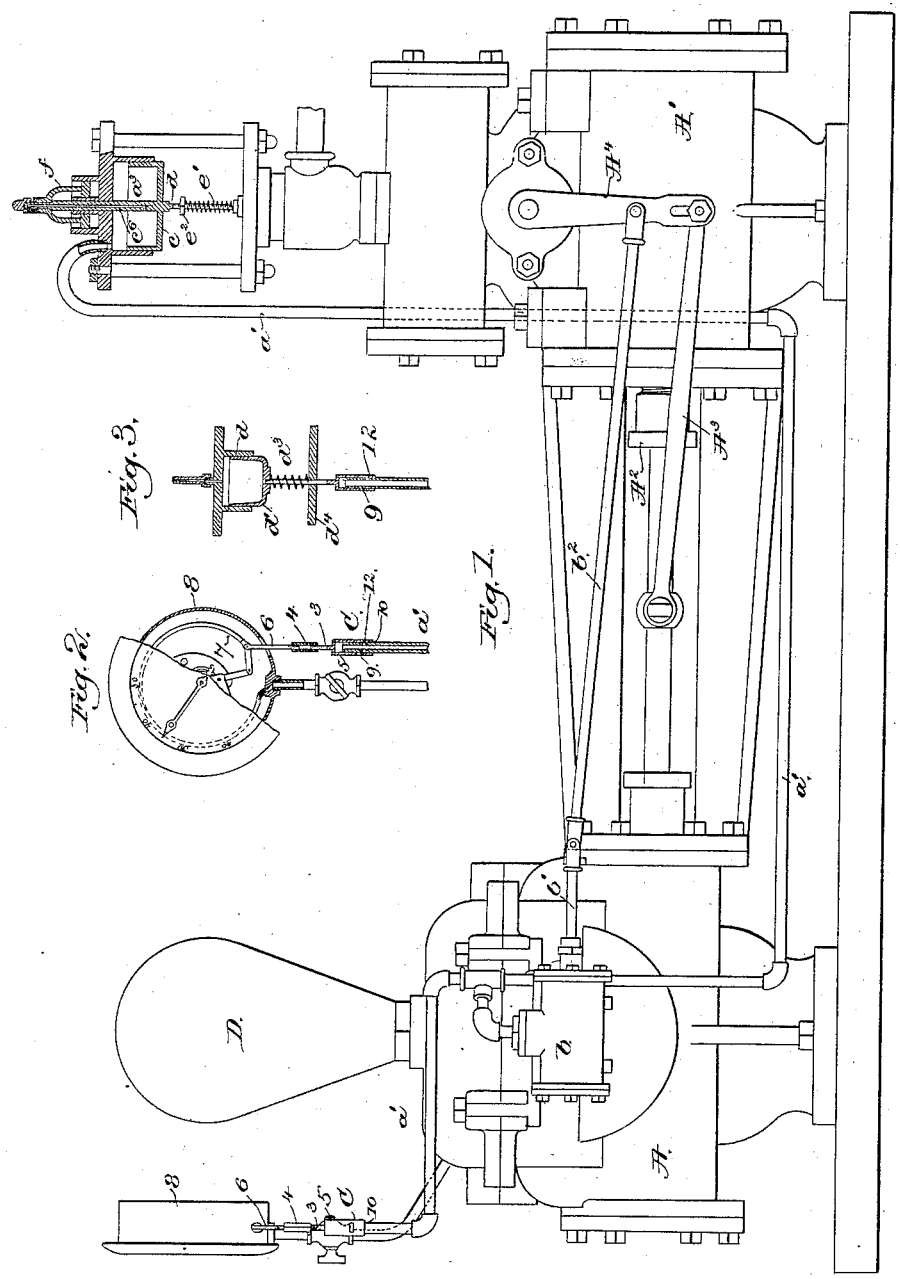
Witnesses.
John F. C. Prinkerts
Fred L. Emery.
Inventor.
Charles B. Bosworth.
by Crosby & Gregory
attys

UNITED STATES PATENT OFFICE.

CHARLES B. BOSWORTH, OF EVERETT, ASSIGNOR, BY DIRECT AND MESNE ASSIGNMENTS, TO THE NEW ENGLAND MANUFACTURING COMPANY, OF BOSTON, MASSACHUSETTS.

AUTOMATIC PRESSURE-REGULATOR.

SPECIFICATION forming part of Letters Patent No. 333,818, dated January 5, 1886.

Application filed September 7, 1885. Serial No. 176,350. (No model.)

*To all whom it may concern:*

Be it known that I, CHARLES B. BOSWORTH, of Everett, county of Middlesex, and State of Massachusetts, have invented an Improvement in Automatic Pressure-Regulators, of which the following description, in connection with the accompanying drawings, is a specification, like letters on the drawings representing like parts.

This invention is an improvement on that described in United States application Serial No. 167,222, dated June 1, 1885, and has for its object to automatically regulate the pressure of steam-pumps, thereby controlling their speed, so that any increase or decrease in the amount of water discharged by the pump will cause a corresponding increase or decrease of air-pressure upon a piston connected to the throttle-valve, closing or opening the said valve to admit more or less steam into the steam-chest, and actuate the pump to maintain a uniform discharge of water at the established rate.

In accordance with my invention, I have provided the pipe described in the said patent as connecting the air-compressing pump with the steam-pump with a valve, as will be hereinafter described, which is preferably located at the end of the said pipe in close proximity to the steam-gage, the said valve being combined with mechanism whereby it may be opened or closed automatically. The valve referred to is provided with a right and left handed screw, secured to the valve-stem at one end and having its other end connected to the spring of the gage, whereby the said valve may be adjusted, to be operated in a manner to be described, so as to maintain the pressure of the pump and thereby the head of water discharged by the pump at any desired point.

The valve-stem referred to is herein shown as a cylindrical cup inclosing and sliding upon a cylindrical seat, and the said valve-stem and valve-seat are provided with slots, herein shown as radial in direction, whereby an outlet is afforded for the air in the pipe referred to of the air-pump when the slots in the valve-stem coincide with corresponding slots in the valve-seat, thereby releasing or diminishing the pressure on the piston connected to the throttle-valve of the pump, and allowing the said piston to be operated by a spring or other suitable means to open the throttle-valve and admit steam to the steam-chest in a manner substantially as set forth in the patent referred to.

Figure 1 is a side elevation of a steam-pump embodying my invention, and Fig. 2 a detail showing the valve-stem connected to the spring of the gage, and Fig. 3 a detail to be referred to.

The pump A, steam-chest A', its piston $A^2$, connecting-rod $A^3$, arm $A^4$, air-pump $b$, its piston-rod $b'$, connecting-rod $b^2$, compressed-air pipe $a'$, air-chamber $a^3$, piston $c$, its piston-rod $c^6$, rod $d$, adjusting-nut $e^2$, spring $e'$ on the rod $d$, and sleeve $f$ are all substantially as set forth in the said patent.

To automatically regulate the pressure and thereby the speed of the pump, I have provided the pipe $a'$, which connects the air-pump $b$ with the air-chamber $a^3$ of the throttle-valve controller described in the patent referred to with a valve, C, to be described. (See Fig. 2.) The valve C has at one end a screw, 3, which is made to enter a nut, 4, screwed upon a screw-rod, 6, jointed to the usual spring, 7, of the pressure-gage, the screw and rod being provided, respectively, with right and left threads, so that by the rotation of the nut the position of the valve may be changed in the pipe $a'$, and thus normally place the openings or slots 9 at the proper distance above the openings or slots 12, in order that the said openings may be brought into position to coincide at any desired pressure, the latter being indicated by the gage, and the gage itself moving the valve C. The valve-stem referred to is reciprocated by the expansion and contraction of the spring 7, due to an increase or decrease of pressure in the pump, thereby opening or closing the ports 9 and 12 of the valve C. The opening of the said valve, due to a decrease in the pressure of the pump, releases or diminishes the pressure upon the piston $c$, allowing the spring $e'$ to move upward, the piston $c$, its piston-rod, the rod $d$ attached thereto, and the stem of the throttle-valve to open the said throttle-valve and admit steam to the steam-chest, thereby increasing the speed of the pump substantially as described in the above-mentioned patent. The increased speed of the pump expands the spring 7, which closes the ports 9 and 12 and thereby the throttle-valve, to again reduce the said speed of the pump.

The pressure at which it is desired the pump should be worked is established by determining the extent of movement of the valve-stem upon its seat, which extent of movement is regulated by the adjusting-nut 4. Let it be assumed that the pressure of the pump has been adjusted so that the pump will supply a certain amount of water, then, if for any reason, such as the opening of cocks in additional pipes connected with the main pipe, the amount of water consumed or used becomes greater, the pressure of the pump would fall; but as soon as it begins to fall the spring 7 of the gage 8 contracts and moves the valve-stem so as to open the ports 9 and 12 of the valve C, affording an outlet for the air in the pipe $a'$, thus diminishing the pressure on the piston $c$, whereupon the spring $e'$ acts to move the said piston, the rod $d$, and throttle-valve stem connected thereto to admit more steam into the steam-chest, increasing the speed of the pump and consequently raising the pressure to a point necessary to discharge the same amount of water from each of the supply-pipes leading from the main; and as the speed of the pump increases, the pressure upon the spring 7 is increased, thereby expanding the said spring and closing the ports 9 and 12, increasing the pressure on the piston $c$, closing the throttle-valve, and thus maintaining the pressure at the point necessary to furnish the amount of water demanded with the same force or head.

If the use or consumption of water should diminish for any reason, such as the closing of cocks in one or more of the supply-pipes, the pressure of the air will be increased, thereby moving the piston $c$, rod $d$, and throttle-valve stem to close the throttle-valve and diminish the amount of steam entering the steam-chest, causing a decrease in the speed of the pump, the slacking of the speed of the pump causing the pressure of the air to fall, and as the pressure falls the spring 7 contracts, moving the valve-stem, as above described, to open the ports of the valve C and diminish the pressure of air on the piston $c$, thereby automatically maintaining the pressure of the air at a point requisite to insure the same head or force to the water issuing from each of the supply-pipes, irrespective of number, within the capacity of the pump.

It is obvious that my invention is applicable, with slight modifications in the manner of connecting the steam-gage with the valve regulating the pressure of the air-pump, to any of the well-known steam-pumps employing an air-pump. It also becomes evident that the form of the valve and the mode of connecting it with the spring or other operating mechanism of the steam-gage may be essentially modified without departing from the spirit of my invention.

As so far described the valve C is operated by a hollow water-spring containing water under pressure; but it is obvious that the said valve might be operated by different devices made movable by the force or pressure of the water—as, for instance, in the modification shown in Fig. 3, wherein is illustrated a chamber composed of two cup-like parts, $d\ d'$, provided with suitable packing between or fitted together water-tight, the movable member having attached to it a rod, it corresponding in purpose and function with the rod 6 shown in Figs. 1 and 2, the said movable member being sustained by a spring, $d^3$, resting upon a plate, $d^4$, attached to or forming part of the casing of the pump.

I claim—

1. In a pressure-regulator for pumps, a pipe to contain compressed air, and one or more outlets therein, and a valve co-operating with the said outlets, combined with a pipe containing fluid under pressure, and with means, substantially as described, actuated by the pressure and not the weight of the said fluid to operate the valve and permit the escape of air from the air-pipe, substantially as described.

2. In a pressure-regulator for pumps, a pipe, $a'$, provided with one or more outlets, and a pump in connection therewith to compress a fluid therein, and a valve to co-operate with the said outlets, combined with a pipe and a pump to force water into the said pipe under pressure, and with means, substantially as described, actuated by variation in pressure of the water to increase or diminish the effective pressure of the pump A.

In testimony whereof I have signed my name to this specification in the presence of two subscribing witnesses.

CHARLES B. BOSWORTH.

Witnesses:
JAS. H. CHURCHILL,
G. W. GREGORY.